United States Patent [19]

Wahls

[11] 4,264,050
[45] Apr. 28, 1981

[54] SEAT LEVELING DEVICE

[75] Inventor: Robert J. Wahls, Spring Grove, Ill.

[73] Assignee: The Freedman Seating Company, Northbrook, Ill.

[21] Appl. No.: 25,850

[22] Filed: Apr. 2, 1979

[51] Int. Cl.³ ............................................... A47C 3/30
[52] U.S. Cl. .................... 248/550; 248/543; 248/585
[58] Field of Search .................. 248/543, 550

[56] References Cited

U.S. PATENT DOCUMENTS

| 3,150,855 | 9/1969 | Carter et al. | 248/550 |
| 3,325,136 | 6/1967 | Radke et al. | 248/550 |
| 3,638,897 | 2/1972 | Harder | 248/550 |
| 3,667,707 | 6/1972 | Mui | 248/550 |
| 3,749,339 | 7/1973 | Avedissian | 248/550 |
| 3,954,245 | 5/1976 | Costin | 248/550 |
| 3,999,800 | 12/1976 | Penzotti | 248/550 X |

Primary Examiner—William H. Schultz
Attorney, Agent, or Firm—Alter and Weiss

[57] ABSTRACT

A seat leveling apparatus for air-suspension seats of the type used in over-the road vehicles moves the seat to its lowermost position when the driver alights therefrom. When the driver reenters the seat, apparatus is provided to raise the seat to a preselected driving position responsive to the weight of the driver on the seat.

20 Claims, 9 Drawing Figures

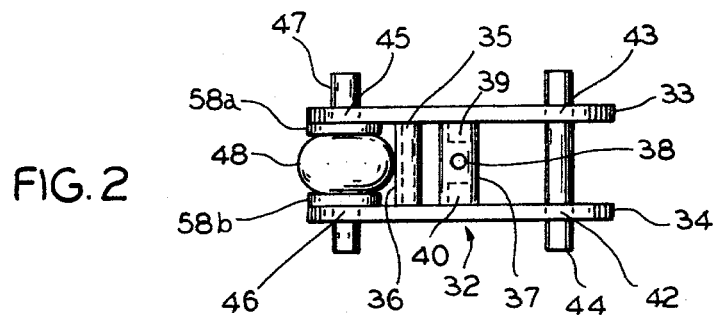
FIG. 2
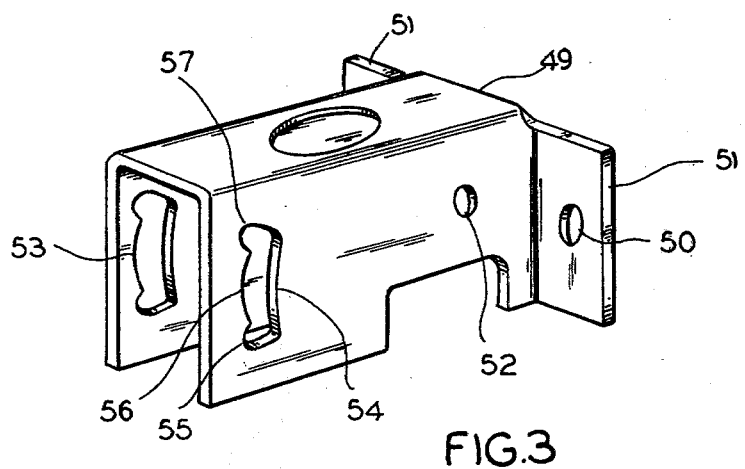
FIG. 3
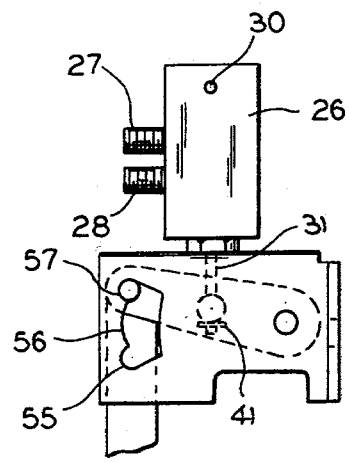
FIG. 4
FIG. 5
FIG. 6

SEAT LEVELING DEVICE

This invention relates to improved vehicle seats, and more particularly, to a suspension system for use in conjunction with vehicle seats customarily used in over-the road vehicles.

Driver comfort has long been of great concern for drivers of over-the road vehicles such as buses and trucks, primarily because seat comfort is an important factor in alleviating driver fatigue, thereby making it easier for a driver to remain alert and to drive safely.

Many such seats feature adjustments which allow the driver to change the characteristics of the seat to fit the driver's own preferences and to compensate for different road surfaces. Adjustments such as the height of the seat and the rate at which the seat deflects either in a horizontal or vertical direction, make it safer and more comfortable for drivers of varying sizes and weights to conveniently operate the same vehicle. Thus, for example, the driver's seat on a bus must be adjustable over a wide enough range to accommodate all drivers who, at one time or another, will be driving the bus.

It is important that such adjustments be made quickly and conveniently, to minimize the amount of time necessary to readjust a seat for a new driver. If such adjustments are awkward or time consuming, the new driver may choose to forego carrying out the adjustments, and thus defeat all the reasons for which such seats have been developed.

One of the more popular and effective means for achieving driver comfort has been the use of the air spring suspension. In such a suspension, varying the amount of air compressed in an air spring effectively controls the height of the seat and the rate at which the seat moves under a given weight load. Typically, vehicles such as tractors for semi-trailer trucks have a ready source of compressed air to power such seats because other truck components, such as brake systems, use compressed air.

In the past, seats such as that described in U.S. Pat. No. 3,599,232 have provided for a certain degree of adjustability utilizing an air spring. However, such seats have still presented a degree of inconvenience and driver discomfort.

It is well known, for example, to vary the height of a seat by controlling the amount of air entering an air spring. Such springs, however, must compensate not only for the height of the driver but for the weight of the driver. If, for example, two drivers are of the same height, but one weighs substantially more than the other, the seat suspension must maintain the seat at the same driving height, while providing comfortable seating for both drivers. In the past, adjustments such as these have been made by the driver who manually opened or closed an air valve to allow compressed air to enter or leave the air spring. In some seat suspension systems, the seat height is controlled by the air pressure within the spring, with greater pressure being used for heavier drivers. However, when the driver leaves the seat, the air pressure within the spring tends to cause the seat to rise. When the driver reenters the vehicle the seat bottom is typically quite close to the bottom of the steering wheel, making it awkward and uncomfortable for the driver to reenter the seat until sufficient weight is placed on the seat to lower it to its present driving height.

Prior seat suspensions have also adjusted for particularly long seat displacements, as, for example, over rough roads, by providing a valve mechanism which adds air to the air spring or exhausts it from the air spring responsive to the movement of the seat and driver. Such systems require the valves to be in virtually constant use, which tends to put great strain on the valves, resulting in breakdowns requiring frequent part repair or replacement.

Accordingly, the present invention has the following objects:

To provide a vehicle seat suspension system for absorbing the shocks and vibrations transmitted to the seat from the moving vehicle;

To provide such suspensions whereby the height of the seat may be conveniently reset while driving;

To provide such suspensions with apparatus to bring the seat to its lowermost position in order to facilitate driver reentry;

To provide such suspension systems with apparatus to absorb relatively large seat displacement without activating the air supply valve;

To provide such suspension with adjustments which are simple and easy to read; and To provide such suspension systems in forms simple to manufacture and reliable to use.

These and further features and objects will become more apparent, and the invention itself will be best understood, by reference to the following description and drawings, wherein:

FIG. 2 is a top plan view of the valve control arm linkage;

FIG. 3 is a perspective view of the control arm linkage housing;

FIG. 4 is a partial side view illustrating the adjusting mechanism in a neutral position;

FIG. 5 is a partial side view showing the adjusting mechanism in a fill position;

FIG. 6 is a partial side view showing the adjustment mechanism in an exhaust position;

Figure 1:
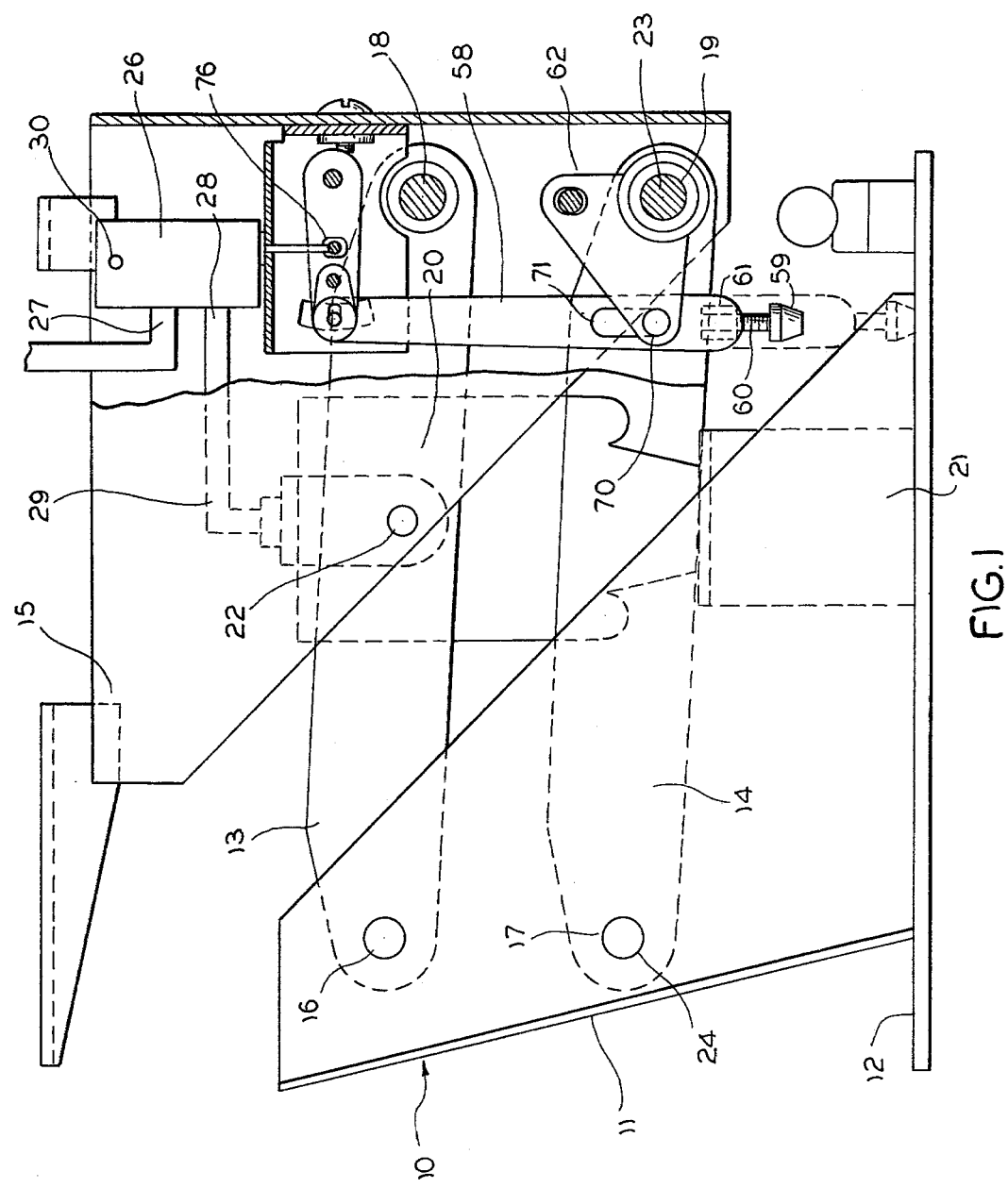
FIG. 1 is a partial side sectional view of a preferred embodiment of the invention presented herein.
Figure 9:
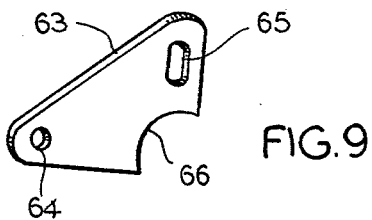
FIG. 9 is a perspective view of the height adjustment sector plate.

Consistent with the foregoing figures and objects, a seat suspension 10 has air spring 20 used to control the height of seat pedestal 15 and the rate at which suspension 10 deflects responsive to shocks. Filling and emptying of air spring 20 is controlled by valve 26 responsive to movement of valve control link 32. Seat pedestal 15 is maintained in its lowermost attitutde until an occupant is seated thereon. Control arm 58 then activates air valve 26 to fill air spring 20; when a preselected seat height is reached, sector plate pin 70 pulls air valve 26 to a neutral position via control arm 58. When the occupant leaves the seat, the air pressure in air spring 20 causes seat pedestal 15 to rise until control arm 58 draws air valve 26 into an exhaust position, allowing seat pedestal 15 to proceed in its lowermost position, whereupon control arm 58 pulls air control valve 26 to a neutral position. The height of seat pedestal 15 may be preselected by height control which varies the position at which control arm 58 exerts sufficient force to move air control valve 26 to another control attitude.

Referring now to FIG. 1, the numeral 10 indicates generally a seat suspension assembly having a base 11 affixed to floor plate 12 and parallel seat linkages 13 and 14 joining base 11 to pedestal support assembly 15 upon which the driver's seat pad (not shown) is supported. In the embodiment herein presented, seat link arms 13 and 14 are pivoted to base 11 at pivots 16 and 17 respectively, and to pedestal assembly 15 at pivots 18 and 19, respectively. Link arms 13 and 14 have been depicted to be representative of known seat suspensions having link arms arranged in parallel and opposed pairs. It is intended, however, that the present invention be adaptable for use with other seat suspension constructions as well.

Seat pedestal assembly 15 may be raised or lowered with respect to base 11 by effecting movement of one or both pairs of link arms. In the embodiment herein shown, such movement is effected by and controlled by air spring 20, secured at its lowermost end 21 to floor plate 12, and pivotally attached to, in this embodiment, link arm 13 at air spring pivot 22.

Figure 8:
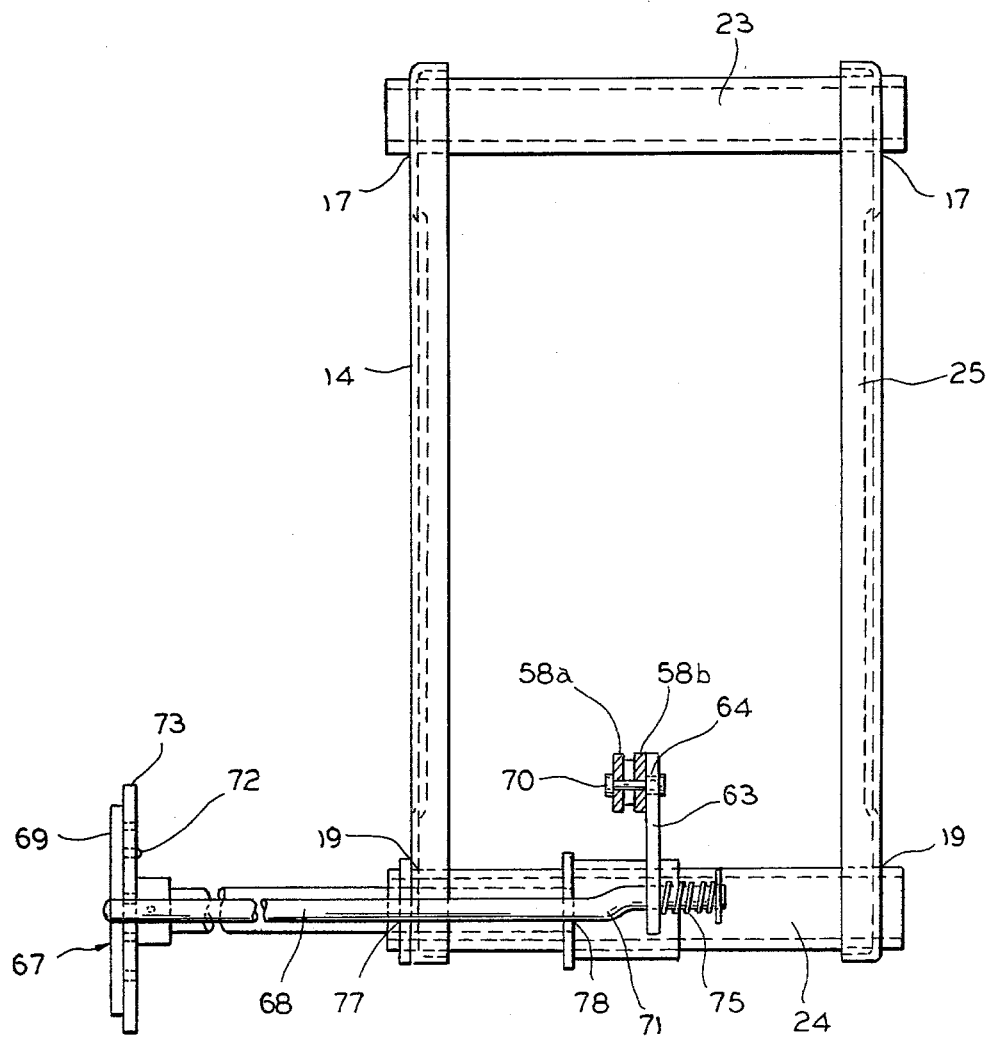
FIG. 8 is a top plan view of the seat height adjustment control linkage.

As best seen in FIG. 8, link arm 14 has a corresponding link arm 25, parallel thereto, thereby completing the lower seat support linkage. Link arms 14 and 25 pivot upon front link shaft 23 at 17, and rear link shaft 24 at 19, respectively.

Compressed air enters air spring 20 through control valve 26, shown here in block diagram form. It has been found that several commercially available air valves are satisfactory for adjusting and controlling seat functions. One such valve control found to be useful is manufactured by Teledyne Republic Mfg. Co., of Cleveland, Ohio as model No. 693B-3-Y8D2. As may more easily be seen from FIGS. 4, 5, and 6, control valve 26 has an air inlet 27 from the supply of compressed air, and a supply outlet 28 which may be connected by air line 29 to air spring 22. An air outlet 30 may be provided to allow air to escape from air spring 20, when required.

Control valve 26 is provided with intake, exhaust, and neutral positions. Selection of the desired position is controlled by moving valve arm 31 in toward and outward from control valve 26. FIG. 4 illustrates plunger 31 in a neutral attitude. In this position, no air is passing through control valve 26. In FIG. 5, plunger 31 is shown in an intake attitude, whereby compressed air enters inlet 27, passes through control valve 26, and exits through outlet 28, thereby entering air spring 20. In FIG. 6, plunger 31 is shown in an exhaust attitude, whereby air contained in air spring 20 is exhausted through port 30.

Selection of the required plunger attitude, in this preferred embodiment, is effected by movement of valve control link 32, as will be more fully set forth hereinbelow. FIG. 2 is a top plan view of valve control link 32 which, preferably, includes a pair of spaced apart side links 33 and 34 joined together by connecting pin 35. In a preferred embodiment, a plunger roller 37 is rotatably maintained between side links 33 and 34, by nubs 39 and 40 which extend into journaled-out positions of plunger roller 37, as seen in FIG. 2. Plunger aperture 38 formed through roller 37, is sized to accommodate plunger 31 therethrough, as best seen in FIGS. 4, 5, and 6; plunger 31 may be secured therethrough by, for example, cotter pin 41, as shown. Valve control link 32 also has opposed pivot apertures 42 and 43 formed therethrough to accommodate assembly pivot pin 44.

Bias pin apertures 45 and 46 enable bias pin 47 to be passed therethrough, upon which is mounted rubber bias roller 48.

Valve control link 32 is pivotally supported within assembly housing 49, illustrated in perspective at FIG. 3. Housing 49 is secured to a convenient frame member of seat assembly 10 by suitable fasteners passing through mounting apertures 50 formed on ears 51.

Housing 49 is formed with opposed housing pivot apertures 52 as shown in FIG. 3, through which assembly pivot pin 44 may be passed to pivotally retain valve link assembly 32 therein. Similarly, slots 53 and 54 accommodate bias pin 47. When assembly 32 is therein positioned, it may be pivoted about assembly pivot pin 44, as shown in FIGS. 4, 5 and 6. In so doing, plunger 31, extending through plunger aperture 38, is moved in an upward or downward direction, thereby controlling the functioning of air control valve 26.

As best seen in FIG. 3, slots 53 and 54 have matching detents formed therein, as exemplified by 55, 56, and 57. Bias roller 48 exerts a lateral force on bias pin 47 to maintain bias pin 47 within detents 55, 56, and 57 as seen in FIG. 3 and FIGS. 4 through 6. In this manner, valve control links 32 will tend to remain fixed in a selected attitude of rotation, thereby fixing the functioning attitude of control valve 26, until sufficient force is exerted on valve control link 32 to force bias pin 47 to another detent. In the specific embodiment herein discussed, when bias pin 47 is positioned at detent 55, air valve 26 is in the exhaust attitude, at detent position 56, air valve 26 is in a neutral attitude, and at detent position 57, air valve 26 is in a fill attitude.

In a preferred embodiment of the present invention, actuation of air control valve 26, and thereby air spring 20 occurs responsive to the mounting and dismounting of the seat's occupant. Structure is provided to automatically raise support pedestal assembly 15 to a selectable height responsive to the weight of the seat's occupant upon first occupying the seat, and structure is provided to automatically return the seat to its lowermost position after the occupant leaves the seat, to facilitate subsequent reuse of the seat.

As best seen in FIG. 1, and FIG. 2, control arm 58 is mounted coaxially with bias roller 48 on bias pin 47, and extends downwardly. In this illustrated embodiment, control arm 58 includes a pair of spaced apart side members 58a and 58b.

As best seen in FIG. 1, control arm 58 extends downward, and terminates with an adjustable rubber stop member 59 mounted on threaded shaft 60, and threaded through a cross member 61 joining control arm elements 58a and 58b. The length to which stop member 59 extends from the bottom of control arm 58 may be varied by threading shaft 59 upwardly through cross member 61 or, conversely, threading shaft 60 to extend downward from cross member 61. Thus, as support pedestal assembly 15 moves downward with respect to base 11, through the action of air spring 20, control arm 58 may be adjusted to strike floor 12 when support pedestal assembly 15 is at a selected distance above floor 12.

When a passenger occupies seat assembly 10, the passenger's weight is sufficient to lower support pedestal assembly 15 until stop member 59 comes in contact with floor 12. At that point, control arm 58 ceases to move downward, however, support pedestal assembly 15 continues downward with enough force to force bias pin 47 to detent 57 on assembly housing 49, as best seen in FIG. 5. At that point, control valve 26 is in a fill attitude, and compressed air is supplied via outlet 28 to air spring 20, causing support pedestal assembly 15 to rise together with the seat occupant.

Figure 7:
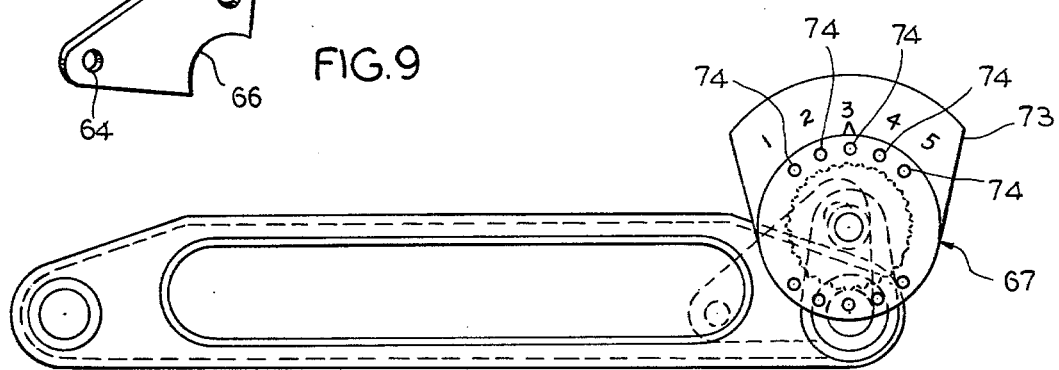
FIG. 7 is a partial side view of the seat height adjustment control.

To limit the filling, and subsequent rising of support pedestal assembly 15, sector plate assembly 62 is provided, as best seen in FIG. 1 and FIGS. 7, 8, and 9. Sector plate assembly 62 includes sector plate 63, shown in perspective in FIG. 9, having pin aperture 64, adjustment slot 65, and shaft cut-out 66 formed therethrough. As seen in phantom in FIG. 7, and as seen in FIG. 8, sector plate 63 is positioned with shaft cut-out 66 resting upon link shaft 24. Control assembly 67, as shown in FIGS. 7 and 8, includes control shaft 68 and control knob 69. Sector plate 63 is connected to control arm 58 by sector plate pin 70 which extends through a pair of elongated slots 71 formed through control arm segments 58a and 58b. In this manner, control arm 58 may travel upward or downward, limited by contact with sector plate pin 70.

Control assembly 67 operates to position sector plate pin 70 at a elected distance above floor 12, thus varying that point at which control arm 58 will engage sector plate pin 70. This is accomplished by forming control shaft 68 with an offset portion 71 such that, when control knob 69 is turned, and control shaft 68 thereby rotated, segment 71 will move through an arc to either raise or lower sector plate pin 70. By limiting the number of positions to which control knob 69 may be moved, it is possible to position sector plate pin 70 so that it may be positioned a consistently reproducable distance above floor 12 while remaining within slot 71. In one such method, control knob 69 is provided with a lock pin 72, as shown in FIG. 8. Control plate 73, as shown in FIG. 7, has a series of control lock apertures 74 formed thereon, herein marked consecutively one through five. Bias spring 75 may be mounted to the end of control shaft 68 in a well-known fashion such that when control pin 72 is inserted through a single control aperture 74, it will remain in the selected aperture until control knob 69 is pulled outward, against the bias of spring 75, to lift control pin 72 from said aperture, at which point it may be moved to another selected aperture. In this manner, the height of seat pedestal assembly 15 may be quickly, accurately, and reproducably set by the seat's occupant each time the seat is to be used.

By so limiting the positions to which sector plate pin 70 may be moved, control assembly 67 actuates air control valve 26 in the following manner. When an occupant alights from support pedestal assembly 15, the air pressure present within air spring 20 forces support pedestal assembly 15 upward. This travel is limited when control arm 58 moved upward until the lowermost portions of slot 71 encounter sector pin 70. At that point, bias pin 47 is pulled downward into detent 55, thus moving air control valve assembly 26 into an exhaust attitude, as illustrated in FIG. 6. As air is exhausted from air spring 20, support pedestal assembly 15 moves downward until stop member 59 encounters floor 12. At this point, sufficient force is transmitted to bias pin 47 by control arm 58 to draw bias pin 47 into detent 56, or into a neutral attitude, as illustrated in FIG. 4. At this point, the travel of support pedestal assembly 15 is interrupted and support pedestal assembly 15 remains in its lowered attitude.

When the passenger returns to the seat assembly 10 and reoccupies the seat, support pedestal assembly 15 is lowered under the passenger's weight until control arm 58 forces bias pin 47 into detent position 57, causing air spring 20 to be filled via air control valve 26. When support pedestal assembly 15 has traveled upward to the point that the lowermost portion of slot 71 encounters sector plate pin 70, bias pin 47 is again drawn into neutral detent 56, and support pedestal assembly 15 rises no further.

Thus, it can be seen that air control valve 26 operates normally only during the required filling and exhausting modes to raise or lower support pedestal assembly 15 responsive to the presence or absence of a passenger. While the vehicle is being operated, however, bumps and other road shocks are commonly encountered. In order to limit the accidental actuation of air control valve 26, plunger roller 37 may be mounted through a pair of oval slots 76 on valve control link 32, as shown in FIG. 1. In this manner, should support pedestal assembly 15 moves slightly with respect to base 11, air control valve 26 will not be actuated by the sudden movement of valve control link 32. Similarly, sudden downward travel of support pedestal assembly 15 will not move control arm 58 to actuate air control valve 26 until sector plate pin 70 has traveled the entire length of slots 71.

Control shaft 68 may be pivotally mounted upon journaled bearings 77 and 78, as shown in FIG. 8, in any convenient and well-known manner. The precise method of mounting control assembly 67 may vary with the geometry of the seat assembly, however, any assembly which will operate to raise or lower sector plate pin 70 with respect to floor 12 within the constraints hereinabove described, will be satisfactory.

While the foregoing has been presented as a preferred embodiment, it is to be understood that this embodiment is presented by way of example only. It is expected that others skilled in the art will preceive variations which, while differing from the foregoing, do not depart from the spirit and scope of the invention as described and claimed.

I claim:

1. Apparatus for adjustable seat suspension, said apparatus utilizable with seats of the type having a base attached to the floor of a vehicle, a pedestal supporting a seat, and structure joining said pedestal and said base enabling said pedestal to move with respect to said base thereby raising or lowering said seat, said apparatus comprising:
   means to adjust the height of said seat with respect to said base;
   means to control said adjustment means,
   said control means adapted to enable the positioning of said seat with respect to said base,
   said control means having a first attitude, a second attitude, and a third attitude; and
   means to actuate said control means responsive to movement or deflection of said pedestal,
   said actuating means including a link arm having two ends,
   the first of said ends being connected to said control means,
   the second of said two ends positioned to contact said floor when said seat is lowered a pre-selectable distance;
   said link arm having a slot formed therethrough intermediate said first and second ends,
   said actuating means further including means positionable within said slot to direct the motion of said link arm with respect to said control means when said seat is being raised with respect to said base.

2. The apparatus as recited in claim 1 wherein said second end has a stop means positioned thereat,
said stop means including a pin; and
structure supporting said pin to enable the height of said pin to be varied with respect to said floor.

3. The apparatus as recited in claim 2 wherein said structure includes a sector plate,
said sector plate being rotatable in a vertical plane to raise or lower said stop means with respect to said floor.

4. The apparatus as recited in claim 1 wherein said actuating means is adapted to move said adjustment means from said second attitude to said first attitude when said pedestal is moved downward to engage said actuating means with said floor.

5. The apparatus as recited in claim 1 wherein said actuating means is adapted to move said control means from said first attitude to said second attitude when said pedestal is raised with respect to said base.

6. The apparatus as recited in claim 1 wherein said actuating means is adapted to move said control means from said second attitude to said third attitude when said pedestal is raised with respect to said base.

7. The apparatus as recited in claim 1 wherein said actuating means is adapted to move said control means from said third attitude to said second attitude when said pedestal is moved downward to engage said actuating means with said floor.

8. Apparatus for seat suspension, said suspension of the type having a base attached to the floor of a vehicle or the like, a supporting pedestal, a seat thereon, and structure joining said base to said support pedestal whereby said support pedestal may be raised or lowered with respect to said base, said structure including a first pivot shaft joining said structure to said support pedestal, and a second pivot shaft joining said structure to said base, said apparatus comprising:
means to position said support pedestal relative to said base,
said positioning means including an air spring joined to said support pedestal;
means to control air flow to and from said air spring, said control means including an air supply valve,
said air supply valve operating in a first mode to allow air to enter said air spring, a second mode to maintain air within said air spring, and a third mode to exhaust air from said air spring; and
means to actuate said control means,
said actuating means including a first arm adapted to place said air supply valve in one of said modes,
a second arm having two ends,
said second arm connected to said first arm at the first of said ends,
said second arm adapted to move said first arm at the first of said ends,
said second arm adapted to move said first arm responsive to the weight of an occupant either sitting down upon or alighting from said seat,
an outer housing mounted to said support pedestal,
a link arm assembly pivotally maintained within said housing,
said housing having at least one slot formed therethrough,
said slot having a plurality of detents formed therealong,
said link arm assembly having at least one pin traveling in said slot,
said link arm assembly being connected to said air supply valve,
said air supply valve operating in said first mode when said pin rests in a first of said detents, operating in said second mode when said pin rests in a second of detents, operating in said third mode when said pin rests in a third of said detents.

9. The apparatus as recited in claim 8 wherein said housing includes a pair of side walls depending in fixed, spaced apart relationship,
one said slot and said corresponding detents being formed in each said side wall,
said pin extending through both said slots.

10. The apparatus as recited in claim 8 wherein said slot includes three said detents.

11. The apparatus as recited in claim 8 wherein said second link arm is joined to said air supply valve at said pin.

12. The apparatus as recited in claim 8 wherein said second arm depends substantially vertically towards said floor,
said second arm having a stop member positioned at the second of said ends,
said stop member being vertically adjustable to selectively vary the height of said support pedestal with respect to said base at which said stop member strikes said floor.

13. The apparatus as recited in claim 8 wherein said second arm further includes an elongated slot formed therethrough intermediate said first and second ends; and
means disposed within said slot to selectively arrest movement of said second arm with respect to said support pedestal.

14. The apparatus as recited in claim 13 wherein said actuating means further includes means to adjust the position of said arresting means to vary the height above said floor at which said second link contacts said arresting means when said second link is moved vertically upward.

15. The apparatus as recited in claim 13 wherein said arresting means is positioned to engage said second link with sufficient force to move said pin from said second detent to said third detent, thereby moving said air supply valve from said second mode to said third mode.

16. The apparatus as recited in claim 15 wherein said upward movement of said second arm is effected by said occupant alighting from said seat, thereby enabling said air spring to move said seat pedestal upward.

17. The apparatus as recited in claim 12 wherein said stop member is adjusted to engage said fllor, when said support pedestal is lowered responsive to the exhausting of air from said air spring, with sufficient force to cause said second arm to move said first arm and said pin, to move said air supply valve from said third mode to said second mode.

18. The apparatus as recited in claim 12 wherein said stop member may be adjusted to exert a sufficient force on said first arm to move said air supply valve from said second mode to said first mode responsive to the weight of said occupant being seated on said seat.

19. The apparatus as recited in claim 14 wherein said adjusting means includes a sector plate,
said sector plate being rotatably mounted on said first pivot shaft,
said arresting means mounted on said sector plate, said arresting means being selectively positionable at varying heights above said floor by the rotation of said sector plate on said pivot shaft, whereby the height at which said support pedestal will stop rising may be determined by the height at which said arresting means engages said second arm to move said air supply valve into said second mode.

20. The apparatus as recited in claim 1 wherein said control means further includes a control assembly pivotally mounted to said seat; and means to selectively hold said assembly in a selected attitude of rotation.

* * * * *